July 19, 1955     C. H. RODEBACK     2,713,404
AUTOMATIC BRAKE AND ACCELERATOR COORDINATING DEVICE
Filed Nov. 2, 1953
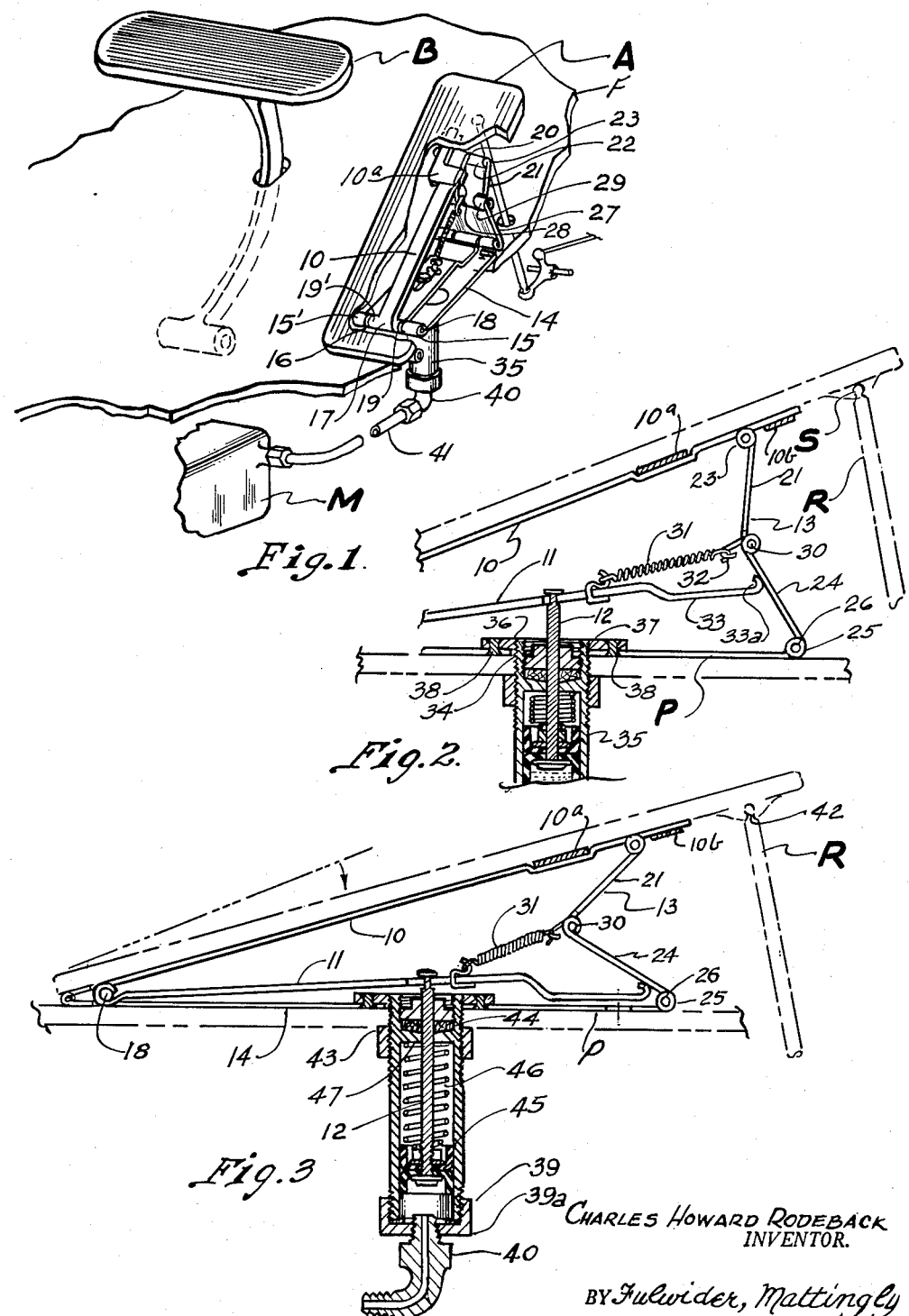
CHARLES HOWARD RODEBACK
INVENTOR.
BY Fulwider, Mattingly & Babcock

United States Patent Office 2,713,404
Patented July 19, 1955

2,713,404

AUTOMATIC BRAKE AND ACCELERATOR COORDINATING DEVICE

Charles Howard Rodeback, San Pedro, Calif.

Application November 2, 1953, Serial No. 389,600

5 Claims. (Cl. 192—3)

The present invention is a continuation-in-part of my pending application entitled, "Automatic Brake and Accelerator Coordinating Device," Serial No. 235,736, filed July 9, 1951, and which has issued as Patent Number 2,662,622 on Decemebr 15, 1953. The present invention relates to an accessory for power vehicles equipped with automatic transmissions, and more particularly to a mechanism that coordinates the action of the accelerator operated by the right foot, and the brake which is more easily and effectively operated by the left foot.

The automatic transmission of the present-day automobile is so constructed that the vehicle is motivated when the engine is accelerated above idling speed. It is a common tendency amongst drivers of vehicles so equipped, particularly after using manually operated gear shifts for years, to subconsciously step on the accelerator for a quick "get-away." When the engine of a modern machine is so accelerated, the vehicle is put into motion and the driver must immediately apply the brake to restrain such movement until the traffic starts to move again. Such acceleration of the engine and braking of the vehicle create two forces working in opposition, resulting in overheating of the driving mechanism which is not only detrimental, but due to such treatment, the transmission may become completely inoperative.

The primary purpose in devising the present invention is to provide a device for coordinating the action of the accelerator and brake of a power vehicle to prevent undue wear and overheating of the automatic transmission.

A primary object of the invention is to supply an accelerator and brake coordinating device adapted to be installed as standard equipment in a power vehicle provided with hydraulic brakes, or which may be mounted on an existing vehicle so equipped.

Another object of the invention is to furnish a device having an extremely simple mechanical structure which may be fabricated from standard commercially available materials, is easy to operate, and requires a minimum of maintenance attention.

Yet another object of the invention is to provide a coordinating device that prevents inadvertent abuse of an automatic transmission of a power vehicle by a driver having no knowledge of the mechanical relationship between the brake and accelerator.

A still further object of the invention is to minimize maintenance cost on an automatic transmission by preventing overheating thereof.

These and other objects and advantages of the invention will become apparent from the following description of a preferred form thereof, and from the drawing illustrating that form, in which:

Figure 1 is a perspective view of the present invention showing it installed in a power vehicle;

Figure 2 is a vertical cross-sectional view of the coordinating device showing the accelerator pedal disposed in the uppermost position it will occupy when the hydraulic brakes of the vehicle are actuated; and Figure 3 is a vertical cross-sectional view of the device when the accelerator pedal is depressed.

Referring now to the drawing for the general arrangement of the invention, it will be seen that hydraulic fluid under pressure from a brake master cylinder M will not only actuate the brakes of a vehicle, but prevent depression of an accelerator pedal A that is pivotally supported from the floor board of a vehicle in a conventional manner during the braking operation. Furthermore, should the accelerator pedal A be in a depressed position at the time the brake pedal B is moved downwardly, pedal A will immediately be moved upwardly by hydraulic pressure to the position it occupies when the engine is idling. Thus, the possibility of a driver concurrently braking and accelerating a vehicle is completely avoided.

The coordinating device of the present invention embodies a base plate P that may be mounted on the upper surface of a floor board F of an internal combustion engine powered vehicle. Normally a movable rod R projects upwardly through the floor board of such power vehicles, which rod is connected by a linkage mechanism (not shown) to the carburetor. Movement of rod R regulates the engine speed by controlling the rate at which the carburetor feeds fuel to the engine.

Base plate P is disposed below, but in alignment with rod R, and pivotally supports the accelerator pedal A, the free upper end of which is movably affixed to the extremity of the rod by a ball and socket connection S, or other suitable means. Pedal A rests on and is slidably movable relative to an elongate first arm 10 that is pivotally supported from base plate B by means that will be described in detail herein.

Movement of arm 10 is controlled by movement of a second arm 11 which is likewise pivotally supported from the base plate P. Arm 11 is movably connected to a piston rod 12 that extends upwardly from a hydraulic cylinder, which cylinder is connected by a tube to the fluid discharge of master cylinder M. The upper free end of arm 10 is movably connected by a linkage mechanism generally identified by the numeral 13. When cylinder M is actuated by downward movement of brake pedal B, rod 12 is forced to its uppermost position, as may be seen in Figure 2, with arms 10 and 11, and linkage 13 cooperating to maintain pedal A in an idling position until the braking operation is completed.

Base plate P is preferably fabricated from a strip 14 of rigid sheet material such as steel, the lower end of which is provided with two laterally spaced eyes 15 and 15' which define a space 16 therebetween. Eyes 15 and 15' are preferably formed by bending two ears projecting from the end of strip 14 into the desired shape.

The width of arm 10 is considerably narrower than that of space 16. The lower end portion of arm 10 is bent or otherwise formed to provide an eye 17 therein. A pin 18 extends through eyes 15 and 15'. Eye 17 positioned in space 16, pivotally engages pin 18 to movably support the first arm 10 from base plate P. Two laterally separated eyes 19 and 19' are formed on the lower end of the second arm 11, which eyes are separated by a space slightly greater in width than that of the first arm 10. Arm 11 is pivotally supported from pin 18, with the eyes 19 and 19' disposed within the confines of space 16 on opposite sides of eye 17. A single, relatively narrow eye 20 is formed on the upper free end of arm 10, and a first link 21 having identical, laterally spaced eyes 22 formed on the upper end thereof is pivotally connected to arm 10 by means of a pin 23 which passes through eyes 20 and 22. Eye 20 is of such width as to be movably disposed between eyes 22.

A second link 24 is pivotally connected to the upper end of base plate P, which plate has eyes 25 formed at this point that engage a horizontal pin 26, also movably engaged by eyes 27 formed on the lower end of second link 23. An eye 28 is provided on the lower end of link 21 that is movably disposed between two eyes 29 formed in the upper end of second link 24. Links 21 and 24 are pivotally connected by a pin 30 that passes through eyes 28 and 29. A helical spring 31 which is at all times in tension, is connected at one end to pin 30 by conventional means, and at the other end by a hook 32 to the upper surface of arm 11. Second arm 11 is preferably formed with a downwardly off-set end section 33, as may best be seen in Figures 2 and 3. Arm section 33 terminates in a U-shaped portion 33a, the outer surface of which is in slidable contact with the interior surface of second link 24. An L-shaped extension 10a affixed to the outer end of arm 10, slidably engages an inverted U-shaped member 10b mounted on the under surface of accelerator pedal A. Pedal A and arm 10 may thus move up and down together as an integral unit.

A centrally disposed opening 34 is formed in base plate P, and the threaded end of a hydraulic cylinder 35 projects upwardly through opening 34 to engage a tapped opening 36 formed in a plate 37. Screws, rivets, or other conventional fastening means 38 serve to affix plate 37 to the upper surface of plate P.

A cap 39 closes the lower end of the cylinder 35. A tapped bore 39a is formed in cap 39 which engages the threaded end of a tubing fitting 40, and a tube 41 extends from fitting 40 to the fluid discharge of master cylinder M.

The piston rod 12 extends downwardly through a plug 43 and suitable packing member 44 mounted in the upper portion of hydraulic cylinder 35 into the confines thereof. A piston 45 of suitable design for use in the hydraulic cylinder 35, is connected to the lower end of rod 12. A helical spring 46 that is at all times in compression, is disposed inside cylinder 35. The lower end of spring 46 contacts the upper surface of piston 45, and the upper end thereof contacts a flange 47. The flange is preferably formed as an integral part of cylinder 35. Due to the compression thereon, spring 46 at all times tends to return piston 45 to the position shown in Figure 3. When assembled in the manner above described, and installed on an internal combustion engine powered vehicle having hydraulic brakes, the present invention is capable of performing its intended function. The tube 41 is connected to the discharge of master cylinder M, and the tube and fitting 40 are completely filled with hydraulic fluid, free from air bubbles.

Operation of the coordinating device is extremely simple. When the brake pedal B of the vehicle in which it is mounted is depressed, hydraulic fluid is discharged from master cylinder M to move piston 45 upwardly. Piston rod 12 moves upwardly with the piston 45, and the second arm 11 is pivoted upwardly in a counter clockwise direction to occupy the position shown in Figure 2. As the second arm moves upwardly, the curved portion 33a thereof slidably engages the interior face of second link 24 to cause clockwise pivotal movement thereof. This upward pivotal movement of the second arm also forces the second link 24 and the first link 21 movably connected thereto, to straighten out relative to each other. In assuming this straightened relationship, links 21 and 24 move the accelerator pedal A upwardly to an idling position. Pedal A can only be moved downwardly with concurrent downward movement of first arm 10, but arm 10 is tied to the movement of second arm 11 due to the linkage 13. Thus, when master cylinder M is actuated, the accelerator pedal A is maintained in its uppermost position, or if it is not in this position, the upward movement of piston rod 12 as the braking action occurs, moves it thereto. The piston is provided with a conventional breather device (not shown) to permit upward and downward movement thereof in cylinder 35.

Spring 31 tends to pivot first arm 10 and second arm 11 downwardly toward one another at all times whereby the linkage 13 will not become stuck in the position shown in Figure 2. The spring 46 also serves to at all times force piston 45 downwardly and maintain it in pressure contact with the fluid in hydraulic cylinder 35. However, the combined tension on spring 31 and compression on spring 46 is not sufficient to move accelerator pedal A beyond its engine idling position without the assistance of pressure thereon from the driver of the vehicle.

Although the invention herein shown and described is fully capable of providing the advantages and achieving the objects hereinbefore mentioned, it is to be understood that it is merely illustrative of the presently preferred embodiment thereof, and is not to be limited to the details of construction herein shown other than as defined in the appended claims.

I claim:

1. A brake pedal and foot accelerator pedal coordinating device for an internal combustion engine powered vehicle having a master hydraulic cylinder that is actuated by downward movement of said brake pedal which includes: a pivotally mounted elongate arm which is affixed to and concurrently moves with said accelerator pedal; a vertically movable rod; means movably connecting said rod to said arm; hydraulically operable means which when actuated, move said rod upwardly a sufficient distance to place said arm and accelerator pedal in an engine idling position; and a tube connecting said hydraulically operable means to the fluid discharge of said master cylinder, with said arm and accelerator pedal being held in an engine idling position so long as said brake pedal is in a depressed position.

2. A brake pedal and foot accelerator pedal coordinating device for an internal combustion engine powered vehicle having a master hydraulic cylinder that is actuated by downward movement of said brake pedal which includes: a pivotally mounted elongate arm which is affixed to and concurrently moves with said accelerator pedal; a vertically movable rod; means movably connecting said rod to said arm; hydraulically operable means which when actuated, move said rod upwardly a sufficient distance to place said arm and accelerator pedal in an engine idling position; a tube connecting said hydraulically operable means to the fluid discharge of said master cylinder, with said arm and accelerator pedal being held in an engine idling position so long as said brake pedal is in a depressed position; and spring means that prevents locking of said arm in an engine accelerating position.

3. A brake pedal and foot accelerator pedal coordinating device for an internal combustion engine powered vehicle having a master hydraulic cylinder that is actuated by downward movement of said brake pedal which includes: an elongate base plate adapted to be mounted on the floor board of said vehicle; a first arm and a second arm pivotally supported from one end portion of said base plate; means for connecting said accelerator pedal to said first arm; inwardly collapsible linkage means connecting the free end portion of said first arm to the free end portion of said base plate, with said linkage means being contacted by the free end of said second arm; hydraulically operable means which when actuated, pivot said second arm upwardly to cause said linkage means to straighten out and move said first arm and accelerator pedal into an engine idling position; a tube connecting said hydraulically operable means to the fluid discharge of said master cylinder whereby said accelerator pedal cannot be moved downwardly during the time said brake pedal is depressed; and spring means that return said linkage means to a movable position after said brake pedal is returned to a non-braking position.

4. A brake pedal and accelerator pedal coordinating device for a power vehicle having a master hydraulic cylinder that is actuated by downward movement of said brake pedal which includes: an elongate base plate adapted to be mounted on the floor board of said vehicle; a first arm and a second arm pivotally supported from one end portion of said base plate; means for connecting said accelerator pedal to said first arm; inwardly collapsible linkage means connecting the free end portion of said first arm to the free end portion of said base plate, with said linkage means being contacted by the free end of said second arm; a hydraulic cylinder affixed to the floor board of said vehicle; a piston mounted in said cylinder; a piston rod extending upwardly from said piston and movably connected to said second arm; a tube connecting the lower portion of said cylinder to the fluid discharge of said master cylinder, with said piston rod being moved upwardly as fluid enters said cylinder to cause said second arm to straighten out said linkage means and move said first arm and accelerator pedal into an engine idling position; and a spring connecting said linkage means and second arm that returns said linkage means to a movable position after said brake pedal is returned to a non-braking position.

5. A brake pedal and accelerator pedal coordinating device for a power vehicle having a master hydraulic cylinder that is actuated by downward movement of said brake pedal which includes: an elongate base plate adapted to be mounted on the floor board of said vehicle; a first arm and a second arm pivotally supported from one end portion of said base plate; means for connecting said accelerator pedal to said first arm; a plurality of inwardly collapsible pivotally connected links, the free ends of which are pivotally connected to the free end portion of said first arm and the free end portion of said base plate; a hydraulic cylinder affixed to the floor board of said vehicle; a piston mounted in said cylinder; a piston rod extending upwardly from said piston and movably connected to said second arm; a tube connecting the lower portion of said cylinder to the fluid discharge of said master cylinder, with said piston rod being moved upwardly as fluid enters said cylinder to cause said second arm to straighten out said linkage means and move said first arm and accelerator pedal into an engine idling position; a spring connecting said linkage means and second arm that returns said linkage means to a movable position after said brake pedal is returned to a non-braking position; and spring means in said cylinder that is at all times in compression and tends to return said fluid to said master cylinder and said links into an inwardly collapsed movable position.

References Cited in the file of this patent
UNITED STATES PATENTS 2,662,622     Rodeback _____ Dec. 15, 1953